United States Patent [19]
Herkes

[11] 3,907,819
[45] Sept. 23, 1975

[54] PERHALOGENATED THIAZOLES

[75] Inventor: Frank Edward Herkes, Wilmington, Del.

[73] Assignee: E. I. Du Pont de Nemours and Company, Wilmington, Del.

[22] Filed: May 14, 1973

[21] Appl. No.: 360,938

[52] U.S. Cl. .................. 260/302 R; 71/90; 424/270
[51] Int. Cl.² ........................................ C07D 277/20
[58] Field of Search ................................ 260/302 R

[56] References Cited
UNITED STATES PATENTS 3,489,757 1/1970 Koppe et al. ..................... 260/302 R 3,833,601 9/1974 Beck et al. ....................... 260/302 R

*Primary Examiner*—Richard J. Gallagher

[57] ABSTRACT

Perhalogenated thiazoles of the formula

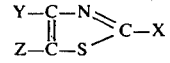

wherein X is fluorine, chlorine or bromine and Y and Z each are chlorine or bromine with the proviso that no more than two of X, Y and Z are bromine are effective soil nematocides with minimal side effects on seeds or plants.

6 Claims, No Drawings

PERHALOGENATED THIAZOLES

FIELD OF INVENTION

This invention relates to certain perhalogenated thiazoles and their use as soil nematocides.

PRIOR ART

The only perhalogenated thiazole previously reported is tribromothiazole [Robba and Moreau, Ann. Pharm. Franc. 22 (3), 201 (1964); Chem. Abs. 61, 3087 (1964)]. Other previously known halogenated thiazoles include the isomeric 2-, 4- and 5-chlorothiazoles, the isomeric 2,4-, 2,5- and 4,5-dichlorothiazoles, and the isomeric 2,4-, 2,5- and 4,5-dibromothiazoles [Reynaud et al., Bull. Soc. Chim. France 1962, 1735; Chem. Abs. 58, 6816 (1963)]. Trichloroisothiazole is also known [Nakagiva et al., Tetrahedron Letters 42, 3719 (1970)].

DESCRIPTION OF THE INVENTION

The novel compounds of the present invention are perhalogenated thiazoles having the formula

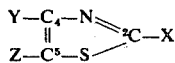   I.

wherein X is fluorine, chlorine or bromine, Y and Z each are chlorine or bromine, and no more than two of X, Y and Z are bromine. A preferred group of such compounds includes those of formula I wherein X is only fluorine and X and Y each are chlorine or bromine.

The compounds of formula I comprise the following:
4,5-Dichloro-2-fluorothiazole
4,5-Dibromo-2-fluorothiazole
4-Bromo-5-chloro-2-fluorothiazole
5-Bromo-4-chloro-2-fluorothiazole
2,4,5-Trichlorothiazole
2-Chloro-4,5-dibromothiazole
4-Bromo-2,5-dichlorothiazole
5-Bromo-2,4-dichlorothiazole
2-Bromo-4,5-dichlorothiazole
4-Chloro-2,5-dibromothiazole
5-Chloro-2,4-dibromothiazole The perhalogenated thiazoles of the invention are useful as soil nematocides which show 70–100% control of nematodes with minimal side effects on associated seeds or plants in closed cup tests at concentrations ranging from 15 to 33 pounds per acre. I have found that the previously known tribromothiazole is also a soil nematocide but shows little control at a concentration of 33 pounds per acre along with 50% growth retardation of associated plants. Trichloroisothiazole, a known isomer of the novel trichlorothiazole, is likewise an effective soil nematocide but also shows inhibition of emergence of sprouts from the associated seeds.

The perhalogenated thiazoles of formula I are obtainable by conventional syntheses employing available materials. The following examples illustrate the preparation, physical properties and nematocidal effectiveness of representative compounds of formula I.

EXAMPLE 1

2,4,5-Trichlorothiazole

A mixture of 34 g (0.221 mole) of 2,4-dichlorothiazole (Reynaud et al., Bull. Soc. Chim. France 1962, 1735) and 0.3 g of antimony trichloride was treated continuously with chlorine at 60°C for 10–15 hours. The disappearance of the 2,4-dichlorothiazole (retention time, 8.75 minutes) as well as the appearance of trichlorothiazole (retention time, 10.75 minutes) was monitored by gas chromatography using a 10 foot × ¼ inch column packed with Chromasorb R containing 10% FS1265 (packing materials of Applied Science Laboratories, Inc.) at 140°C with a flow rate of 30 ml/minute. The mixture was filtered (suction) and the filtrate added to 200 ml of water in a separatory funnel. The resulting mixture was extracted consecutively with three 50-ml portions of ether, and the combined extracts were washed with two 35-ml portions of 5% aqueous sodium bicarbonate, two 35-ml portions of 5% aqueous sodium thiosulfate, and two 50-ml portions of saturated aqueous sodium chloride. After drying, the residue was fractionally distilled to give 39.7 g (96%) of 2,4,5-trichlorothiazole, bp 78°C/11 mm.

Anal. Calcd for $C_3Cl_3NS$: C, 19.15; N, 7.44; Cl, 56.60. Found: C, 19.18; N, 7.48; Cl, 56.79.

DTA: bp 195°C, fp −13°.

IR (neat): 6.72, 7.00, 8.16, 9.43, and 11.49 μ.

UV (EtOH): 2.7mμ($\epsilon$ = 2790), 265mμ ($\epsilon$ = 5400).

In a closed cup soil nematocide test, 2,4,5-trichlorothiazole showed 70% control with no adverse side effects at a concentration of 33 pounds per acre.

EXAMPLE 2

4,5-Dichloro-2-fluorothiazole

A mixture of 25 g (0.133 mole) of trichlorothiazole and 38 g (0.65 mole) of pulverized dry potassium fluoride in 130 ml of tetramethylene sulfone was stirred and heated at 130°C for 24 hours. Then 15 g of additional potassium fluoride was added and heating continued for 18 hours more. Distillation of the mixture gave a product boiling at ~54°C/16 mm. Redistillation of the product gave 12 g (57%) of 4,5-dichloro-2-fluorothiazole, bp 50°–51°C/14 mm.

Anal. Calcd for $C_3Cl_2FNS$: C, 20.95; Cl, 41.23; N, 8.14. Found: C, 21.42; Cl, 41.35; N, 8.11.

DTA: bp 158°C, fp −34°.

IR (neat): 6.49, 8.00, 8.17, 8.56, 9.50, 9.61, 11.24, and 13.39 μ.

UV (EtOH): 245mμ ($\epsilon$ = 3420).

$19_{Fnmr}$ $(CDCl_3)^{F11}$: 4092.0 Hz (δ 72.6 ppm) broad singlet.

In the nematocide test, 4,5-dichloro-2-fluorothiazole showed 100% control at a concentration of 33 pounds per acre.

EXAMPLE 3

2-Bromo-4,5-dichlorothiazole

A solution of 9.3 g (0.050 mole) of trichlorothiazole in 125 ml of glacial acetic acid was treated with 9.5 ml of bromine over a 15-minute period followed by heating at 90°–95°C for 30 hours. The light red solution was neutralized with solid sodium carbonate followed by aqueous sodium carbonate. The mixture was extracted with ether (3 × 50 ml) followed by washing with 5% aqueous sodium carbonate (3 × 35 ml) and water (2 × 35 ml). After drying, the liquid was vacuum distilled to give 6.6 g (57%) of 2-bromo-4,5-dichlorothiazole, bp 91°C/6 mm. Gas chromatography indicated 95% purity.

DTA: bp 226°C, fp + 18°.
IR (neat): 6.73, 7.07, 8.20, 9.55, 9.85, and 11.58 $\mu$.
UV (EtOH): 220m$\mu$ ($\epsilon$ = 2890), 268m$\mu$ ($\epsilon$ = 5710).

The above 2-bromo-4,5-dichlorothiazole gave 100% control at a concentration of 15 pounds per acre in the soil nematocide test.

EXAMPLE 4

4-Chloro-2,5-dibromothiazole

A solution of 10 g (0.0650 mole) of 2,4-dichlorothiazole in 50 ml of glacial acetic acid was treated dropwise with 16 ml (0.292 mole) of bromine over a 15-minute period. The mixture was stirred and heated at 90°C for 30 hours and cooled. The dark solution was neutralized first with solid sodium carbonate, then with 5% aqueous sodium carbonate. The mixture was extracted with ether (3 × 50 ml), followed by washing with 5% aqueous sodium carbonate and water. The solvent was removed after drying over sodium sulfate to yield a dark liquid residue. Fractional distillation of the residue gave 17 g (73%) of 4-chloro-2,5-dibromothiazole, bp 78°C/1.1 mm, $\eta_D^{20}$ 1.6412.

DTA: bp 235°C, fp + 6°
IR (neat): 6.78, 7.10, 8.25, 9.85, and 11.65 $\mu$.
UV(EtOH): 223m$\mu$ ($\epsilon$ = 2680), 268 ($\epsilon$ = 5200).

The above 4-chloro-2,5-dibromothiazole gave 100% control at a concentration of 15 pounds per acre in the soil nematocide test.

EXAMPLE 5

5-Bromo-4-chloro-2-fluorothiazole

A mixture of 15 g (0.054 mole) of 4-chloro-2,5-dibromothiazole and 13 g (0.224 mole) of pulverized potassium fluoride in 60 ml of tetramethylene sulfone was stirred at 125°C for 22 hours. The dark mixture was vacuum distilled to yield two fractions: (1) bp 60°–61°C/10 mm, 3.97 g, all product; and (2) bp 105°C/8 mm, 1 g, 3:1 starting material: product. Fraction 1 was redistilled to give 5-bromo-4-chloro-2-fluorothiazole: bp 70–71°C/18 mm; yield 35%; $\eta_D^{24.5}$ 1.5537.

Anal. Calcd for $C_3BrClFNS$: C, 16.68; N, 6.47. Found: C, 17.02; N, 6.43.

DTA: bp 205°C, fp −42°, Tg −110°, exotherm at −66°.
IR (neat): 6.50, 6.74, 7.99, 8.20, 8.61, 9.94, 11.33, and 13.45 $\mu$.
UV (EtOH): 215m$\mu$ ($\epsilon$ = 2720), 247m$\mu$ ($\epsilon$ = 3700).
$^{19}$Fnmr $(CDCl_3)^{F11}$: 3971 Hz (70.5 ppm) singlet.

In the soil nematocide test, 5-bromo-4-chloro-2-fluorothiazole showed 100% control at a concentration of 33 pounds per acre.

EXAMPLE 6

4,5-Dibromo-2-fluorothiazole

A mixture of 7 g (0.0218 mole) of tribromothiazole and 6.4 g (0.11 mole) of pulverized dry potassium fluoride in 40 ml of tetramethylene sulfone (TMS) was vigorously stirred at 125°C for 20 hours. The mixture was steam-distilled, the distillates were extracted with ether (2 × 75 ml), and the extract was dried over $MgSO_4$. Gas chromatographic analysis (on a 10 foot × ¼ inch 10% FS1265 column at 155°C and flow rate of 30 ml/minute) of the residue after removal of drying agent and solvent indicated the presence of both product and starting material. Fractional distillation of the residue gave 1.0 g (18%) of 4,5-dibromo-2-fluorothiazole.

Anal. Calcd for $C_3Br_2FNS$: N, 5.37; Br, 61.24. Found: N, 5.41; Br, 60.11.

DTA: bp 198°C, fp −17°, exotherm at −64°.
IR (neat): 6.50, 8.04, 8.14, 8.28, 10.02, and 11.88 $\mu$.
UV (EtOH): 215m$\mu$ ($\epsilon$ = 3230), 247m$\mu$ ($\epsilon$ = 3890).
$^{19}$Fnmr $(CDCl_3)^{TMS}$: 3928 Hz (69.6 ppm) singlet.

The above 4,5-dibromo-2-fluorothiazole showed 100% control in the soil nematocide test at a concentration of 33 pounds per acre.

Since obvious modifications and equivalents in the invention will be evident to those skilled in the art, I propose to be bound solely by the appended claims.

The embodiments of the invention in which an exclusive property or privilege is claimed are defined as follows:

1. A perhalogenated thiazole compound selected from 4,5-dichloro-2-fluorothiazole, 2-bromo-4,5-dichlorothiazole, 4-chloro-2,5-dibromothiazole, 5-bromo-4-chloro-2-fluorothiazole or 4,5-dibromo-2-fluorothiazole.

2. The compound of claim 1 wherein X is fluorine and Y and Z are each chlorine, 4,5-dichloro-2-fluorothiazole.

3. The compound of claim 1 wherein X is bromine and Y and Z are each chlorine, 2-bromo-4,5-dichlorothiazole.

4. The compound of claim 1 wherein X is bromine, Y is chlorine and Z is bromine, 4-chloro-2,5-dibromothiazole.

5. The compound of claim 1 wherein X is fluorine, Y is chlorine and Z is bromine, 5-bromo-4-chloro-2-fluorothiazole.

6. The compound of claim 1 wherein X is fluorine and Y and Z are each bromine, 4,5-dibromo-2-fluorothiazole.

* * * * *